INJECTION MOLDING MACHINE

Filed Oct. 30, 1962

INVENTOR.
RICHARD MAIER

BY McGlew & Toren
ATTORNEYS.

United States Patent Office 3,263,276

Patented August 2, 1966

3,263,276

INJECTION MOLDING MACHINE

Richard Maier, Bahnhofstrasse 103, Uzwil, Switzerland

Filed Oct. 30, 1962, Ser. No. 234,063
Claims priority, application Switzerland, Oct. 30, 1961, 12,523/61
4 Claims. (Cl. 18—30)

Degassing of plastic materials in continuously operating screw type extrusion presses is generally well known in the art, and various methods have hitherto been proposed for this purpose, for example, degassing through hollow extruder worms, through porous extruder cylinders, or by means of some vacuum attachment.

Experience has now shown that such degassing means would frequently also appear desirable in conjunction with injection molding machines designed for intermittent injection of individual moldings. Owing to the peculiar operating and pressure conditions, particularly the variable magnitude and direction of the latter, prevailing in injection molding machines as compared with those of extrusion presses the application of similar degasifying means in combination with injection molding machines has not, heretofore, proven satisfactory.

To overcome the draw-backs encountered, certain plastic materials were usually pre-dried for prolonged periods in drying cabinets, with or without simultaneous application of vacuum, before plastification in injection molding machines.

The main objects of this invention are to provide means for eliminating the above mentioned additional treatment and the inconveniences associated therewith by simultaneous dehydration and degasification of the material during plastification.

The invention relates to a screw type injection molding machine comprising an extrusion or processing screw to plastify the molding material in an extruder cylinder, and to force the material into an injection nozzle by reducing the chamber space between the discharge end of the processing screw and the injection nozzle. The injection molding machine of this invention is characterized by a vacuum connection disposed in the extruder cylinder wall section following a decompression zone of the processing screw, and by a back-flow stop disposed near the discharge end of said processing screw.

Two preferred embodiments of the injection molding machine according to this invention will be described by way of examples in the following description with reference to the appended drawings, wherein.

Figures 1, 2:
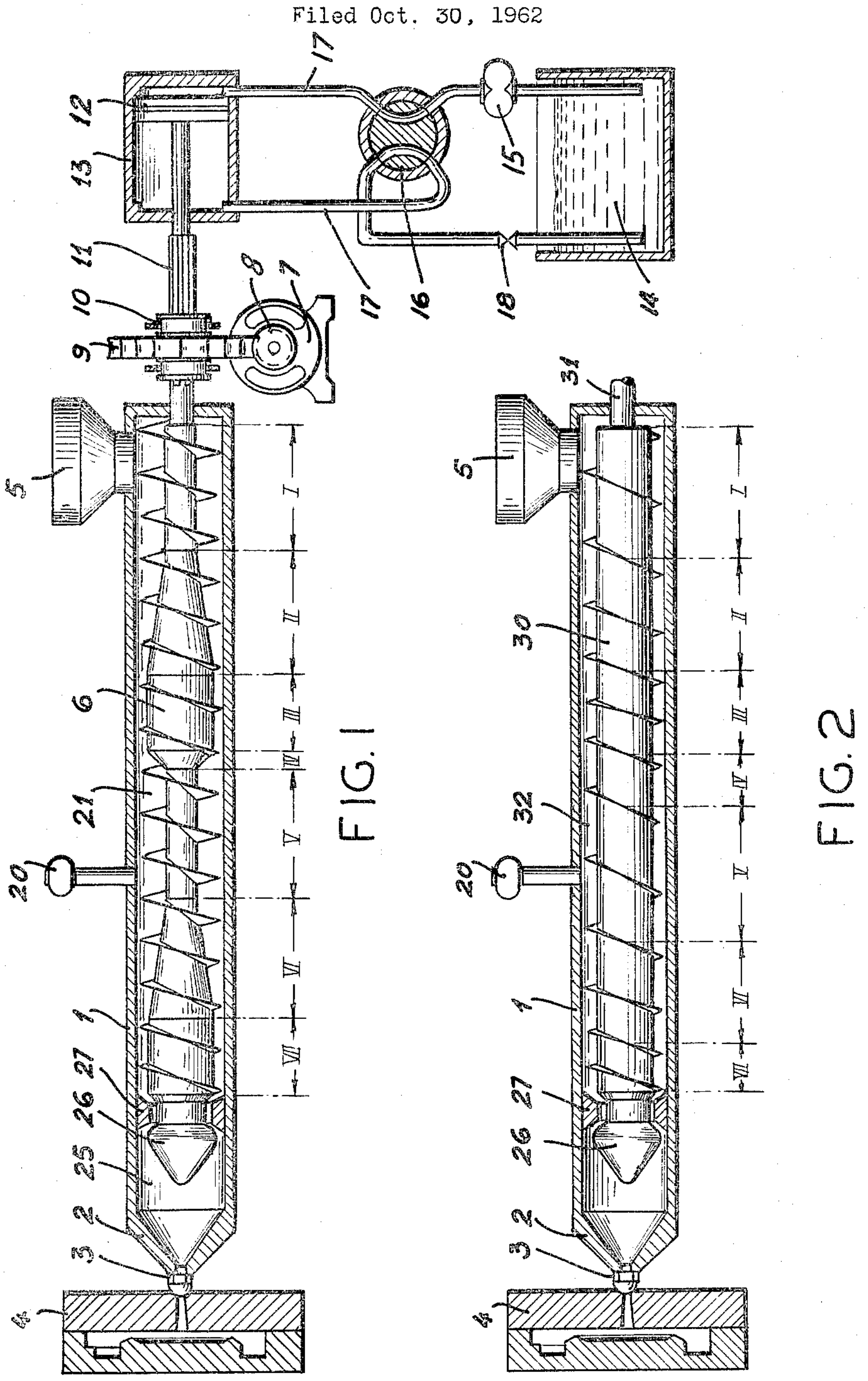
FIG. 1 shows the plasticizing and injection zones of one embodiment of the injection molding machine according to this invention in a partially sectional and partially diagrammatic representation.
FIG. 2 shows a partial longitudinal section of an extruder cylinder including a plasticizing and injection or processing screw of a second embodiment.

As shown in FIG. 1 an extruder cylinder 1 terminates in a cylinder head 2, which is provided with an injection nozzle 3. For the injection operation injection nozzle 3 is to be brought into close contact with mold 4. At the opposite end of extruder cylinder 1 a feed hopper 5 is disposed. Within extruder cylinder 1 a plasticizing and injection screw 6, also called processing screw, is rotatably arranged. In the embodiment under consideration (FIG. 1) the screw 6 is driven by a driving motor 7 through a driving worm 8, a worm wheel 9 and a multi-key driving shaft 11, which meshes with key-ways disposed in the bore of the worm wheel 9. Worm wheel 9 is journalled in and maintained axially aligned by a worm wheel bearing 10. At the end of a rearward extension the multi-key shaft 11 carries an injection piston 12 which is slidably disposed in an injection cylinder 13. The displacement of piston 12 is accomplished by a pressure fluid supplied by a pressure pump 15 from a fluid tank 14 and fed through a multi-way valve 16 and one of two pipes 17 into one of the two injection cylinder chambers which are defined on opposite sides of the piston 12, while the fluid in the other chamber is released through the second pipe 17, multi-way valve 16 and a non-return valve 18 into fluid tank 14.

The processing screw 6 is designed to provide several zones having different screw channel cross-sections resulting in different transfer rates of the material being processed. A feed zone I having a large cross-section and an accordingly large thread channel volume is followed by a first compression zone II having a decreasing cross-section, and a first plasticizing zone III having a relatively small screw channel cross-section for the passage of the material. This first plasticizing zone III is then followed by a decompression or expansion zone IV, a vacuum zone V having a large material transfer section, a second compression zone VI which may be similar in size and shape to the first compression zone II, and finally a second plasticizing zone VII. Vacuum zone V communicates through the cylinder wall with a vacuum attachment 20. In the direction of flow of the material in process, the second plasticizing zone VII is followed by a back-flow stop 27, or check means, which may shutoff the material collecting or injection chamber 25 housing an injector head 26 against the space of the extruder cylinder housing processing screw 6.

The alteration of the through-put cross-section and the transfer volume is realized by variation of the core diameter of the processing screw 6, while the pitch of the screw threads is maintained constant.

This arrangement works as follows:

The material fed from feed hopper 5 into feed zone I is moved forward by the rotating screw 6 towards the injection nozzle 3. In the first compression zone II a certain amount of stabilization and pre-plastification of the material takes place, while further plastification occurs in the first plasticizing zone III. In zone IV the plasticized material expands, but only to such an extent, that the screw thread channels are no longer completely filled, thereby creating negative pressure areas 21 in vacuum zone V. Gases formed during plastification accumulate in these negative pressure areas 21 from where they may be removed by vacuum attachment 20. Subsequent feeding of material into injection chamber 25 requires its renewed compression, which takes place in the second compression zone VI and further plastification in the second plasticizing zone VII. Reactive effects of the injection pressure upon the second compression zone VII, the plasticizing zone VI and particularly vacuum zone V during injection are prevented by back-flow stop 27, which seals injection chamber 25 against the space defined by the threaded length of screw 6.

This arrangement ensures a very effective removal of gases and moisture from the plasticized material without necessitating expensive additional equipment. Gases developed during treatment do not escape through the feed hopper 5, for which therefore no special gas traps are required. The back-flow stop near the injection head moreover prevents plasticized material from leaking into the vacuum zone and the vacuum attachment. The arrangement of the connection for this latter on the extruder cylinder ensures utmost reliability in regard to tightness of the joints.

Another embodiment of the injection molding machine according to this invention is described hereafter in connection with FIGURE 2 of the drawing, wherein parts marked with symbols already used in FIGURE 1 may be basically similar in design and functional effects. In this embodiment however, a processing screw 30 having a cylindrical core is used. Screw 30 is provided with a driving shaft 31 for rotation. The various zones corresponding to those already described in connection with FIGURE 1, are formed by screw threads having a varying pitch as represented in FIGURE 2, the functional effects being basically similar to those explained before.

Characteristic features of the novel injection molding machine consist in its very simple design and assembly as well as in its applicability for a great variety of different materials, which even include substances that hardly develop gases during plastification. The novel design also eliminates practically any danger of undesired plugging of the vacuum drains.

What is claimed is:

1. An injection molding machine comprising, in combination, an elongated, hollow cylinder, of substantially constant internal diameter throughout its length, having an injection chamber and injection nozzle defined at one end thereof and a feed hopper defined at an opposite end thereof for feeding material into said cylinder; a single elongated worm screw, including a longitudinal shaft and a helical thread on said shaft, mounted inside said cylinder for relative rotation and axial reciprocation therein, the rotation of said worm screw plasticizing the material and advancing it toward and into said injection chamber, one end of said worm screw having an injection head defined therein which is situated within said injection chamber rearwardly of said injection nozzle, and is moved toward said injection nozzle by axial reciprocation of said worm screw; means associated with said injection chamber and said injection head to prevent material from being moved from said injection chamber into said cylinder; the parameters of said worm screw being such as to define, with said cylinder, a pair of axially spaced compression zones, each decreasing in volume toward said injection chamber, separated by an axially elongated, substantially constant volume, vacuum zone having an axial length at least equal to the axial reciprocation stroke of said worm screw; and means connected to the interior of said cylinder at said vacuum zone and maintaining a vacuum in said vacuum zone; said worm screw and said cylinder conjointly defining an expansion zone between said vacuum zone and said feed hopper.

2. The injection molding machine according to claim 1, wherein said worm screw is comprised of a longitudinal shaft having different diameters at different longitudinal sections thereof and a constant pitch helical thread disposed around said shaft.

3. The injection molding machine according to claim 1, wherein said worm screw is comprised of a longitudinal shaft of constant diameter and a helical thread of varying pitch disposed around said shaft.

4. The injection molding machine according to claim 1, wherein said worm screw is comprised of a longitudichamber said cylinder and worm screw are so arranged as to define, in series, a feed zone, a first compression zone, a first plasticizing zone, said expansion zone, said vacuum zone, a second compression zone and a second plasticizing zone.

References Cited by the Examiner

UNITED STATES PATENTS

| | | | |
|---|---|---|---|
| Re. 23,880 | 9/1954 | Heston | 18—12 |
| 1,478,842 | 12/1923 | Staley | 18—12 |
| 2,615,199 | 10/1952 | Fuller | 18—12 |
| 2,616,130 | 11/1952 | Banz | 18—30 |
| 2,680,880 | 6/1954 | Corbett | 18—30 |
| 2,836,851 | 6/1958 | Holt | 18—12 |
| 2,970,341 | 2/1961 | Mallory et al. | |
| 3,008,184 | 11/1961 | Fritsch | 18—12 |
| 3,020,591 | 2/1962 | Breher et al. | 18—30 |
| 3,023,456 | 3/1962 | Palfey | 18—12 |
| 3,025,565 | 3/1962 | Doriat et al. | 18—2 |
| 3,035,306 | 5/1962 | Rossiter | 18—12 |
| 3,146,493 | 9/1964 | Steinle et al. | 18—12 |
| 3,148,231 | 9/1964 | Spencer | 18—12 X |

FOREIGN PATENTS

| | | |
|---|---|---|
| 230,910 | 1/1960 | Australia. |
| 1,168,011 | 12/1958 | France. |

WILLIAM J. STEPHENSON, *Primary Examiner.*

ROBERT F. WHITE, MARCUS U. LYONS, J. SPENCER OVERHOLSER, *Examiners.*

H. E. MINCHEW, L. S. SQUIRES, *Assistant Examiners.*